Oct. 4, 1927.
E. GEORGE, JR
1,644,577
CAR COUPLER MOUNTING
Filed Dec. 24, 1926
3 Sheets-Sheet 1
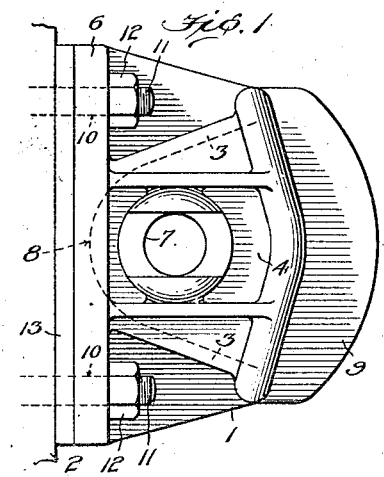
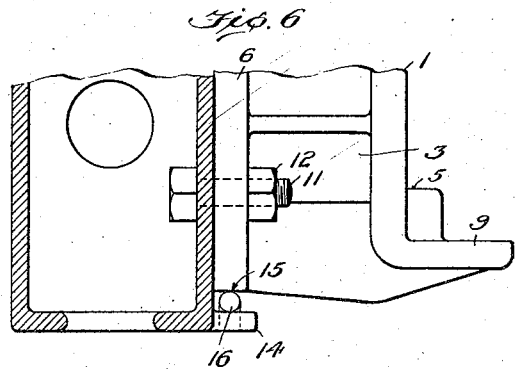
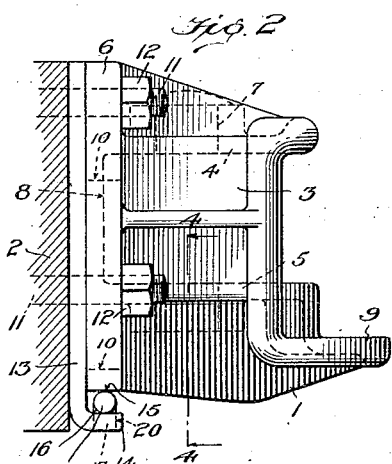
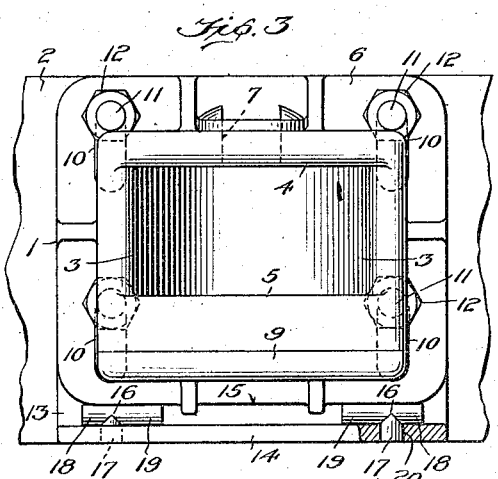
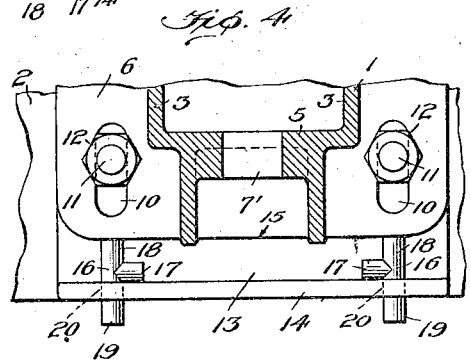
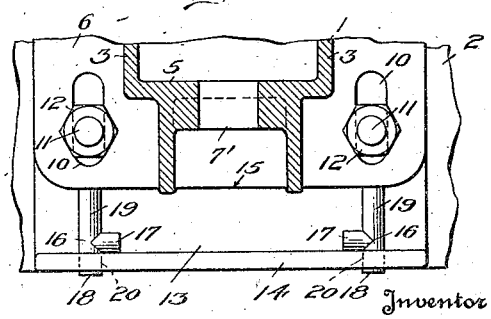

Oct. 4, 1927.
E. GEORGE, JR
1,644,577
CAR COUPLER MOUNTING
Filed Dec. 24, 1926
3 Sheets-Sheet 2
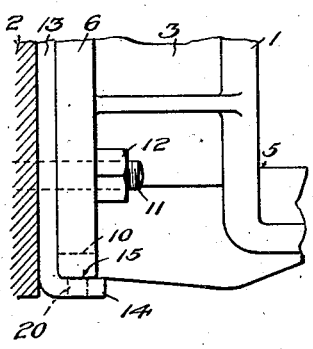
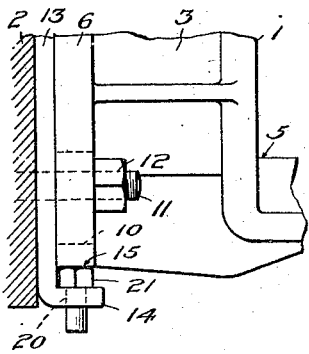
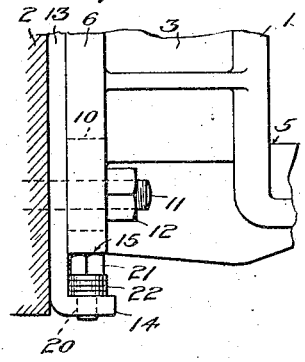
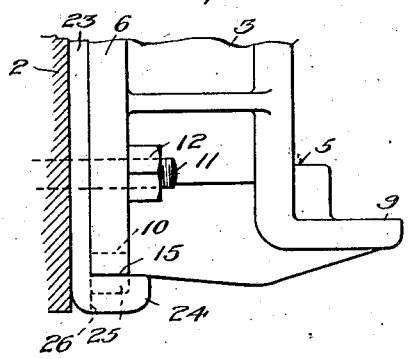
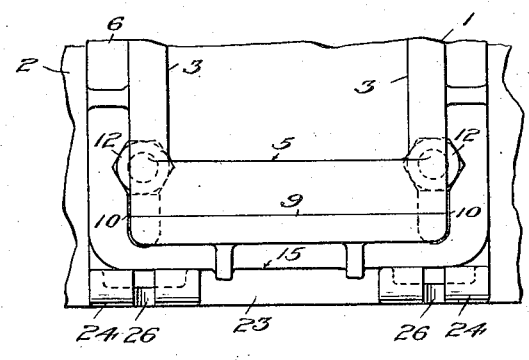
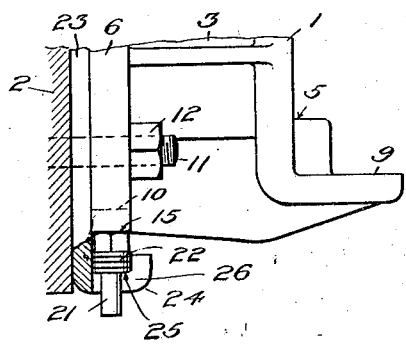
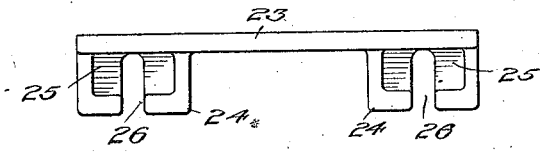

Oct. 4, 1927.
E. GEORGE, JR
1,644,577
CAR COUPLER MOUNTING
Filed Dec. 24, 1926  3 Sheets-Sheet 3
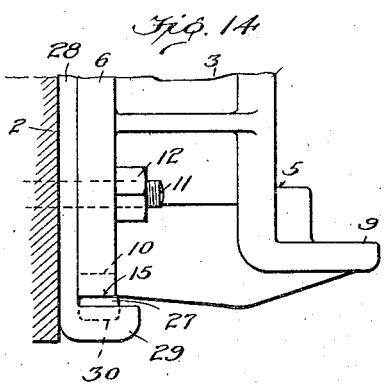
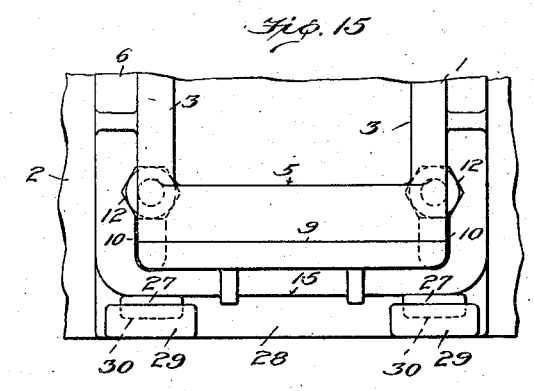
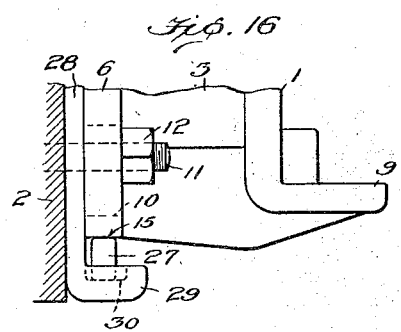
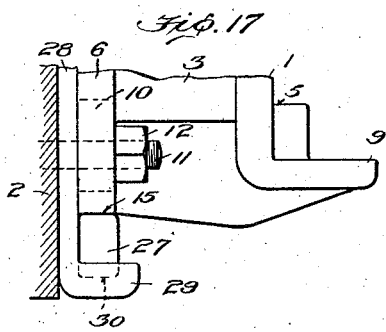
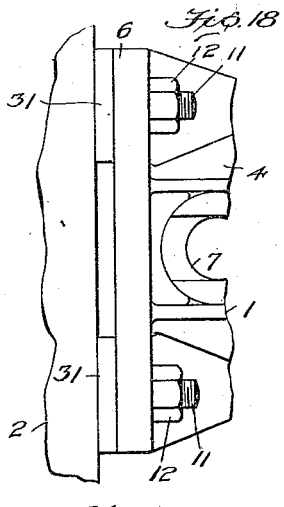
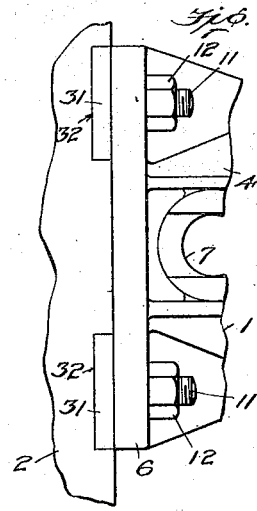
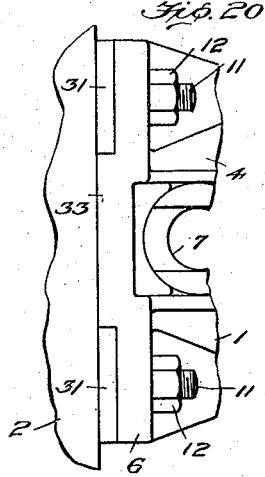
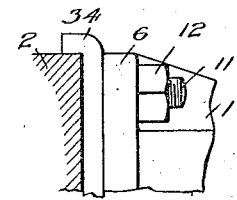

Patented Oct. 4, 1927.

1,644,577

UNITED STATES PATENT OFFICE.

ENOCH GEORGE, JR., OF PITTSBURGH, PENNSYLVANIA, ASSIGNOR TO THE McCONWAY & TORLEY COMPANY, OF PITTSBURGH, PENNSYLVANIA, A CORPORATION OF PENNSYLVANIA.

CAR-COUPLER MOUNTING.

Application filed December 24, 1926. Serial No. 156,878.

This invention relates to a mounting for car couplers and is designed to afford simple and efficient means for readily adjusting the height of the coupler head above the rail so as to compensate for sagging or drooping of the head resulting from permanent set of springs, wear of wheels, or other causes incident to service. The invention is particularly applicable to the mounting of short shank pivoted couplers of the type with which tenders and locomotives are usually equipped.

The principal object of the invention is to provide a coupler mounting enabling the height of the coupler to be changed without the necessity of removing it or its associated pocket member from the bumper or end sill of the railway vehicle.

The principal feature of the invention, generally stated, consists in employing a vertically adjustable coupler pocket to which the coupler is pivotally connected, the pocket member being formed with vertically elongated openings for receiving bolts serving to attach the pocket to the bumper or end sill of the vehicle, means being mounted on the vehicle to constitute an abutment for supporting the weight of the pocket and sustaining it against downward movement, and shims which engage the pocket member in spaced relation to said elongated openings being interposed between the abutment means and the pocket for fixing the height of the latter.

Other features of the invention pertaining to advantageous details of construction and particular relations of parts will hereinafter appear and be pointed out in the claims.

In the drawings,—

Figure 1 is a view of a preferred form of coupler mounting embodying the invention, a portion of an associated bumper or end sill being also shown.

Figure 2 is a side elevational view of the construction shown in Fig. 1, the bumper or end sill being in section.

Figure 3 is a front elevation of the coupler mounting shown in Figs. 1 and 2, the coupler pocket being, as in Fig. 2, in its lowest position of adjustment.

Figure 4 is a detail view, partly in section, on the line 4—4, Fig. 2, illustrating the coupler pocket in its intermediate position of adjustment.

Figure 5 is a view corresponding to Fig. 4, but showing the coupler pocket in its highest position.

Figure 6 is a detail view, partly in side elevation and partly in vertical section, showing the application of the coupler pocket to a cast steel or metal bumper or end sill provided with forwardly extending lugs for supporting the pocket.

Figures 7, 8 and 9 are detail views, partly in side elevation and partly in section, illustrating the availability of bolts and washers as means for adjusting the height of the coupler pocket member shown in Figs. 1, 2 and 3.

Figure 10 is a detail view, partly in side elevation and partly in section, showing a modification of the invention especially suitable for the employment of an adjusting means of the bolt and washer type.

Figure 11 is a front elevational view of the construction shown in Fig. 10.

Figure 12 is a view corresponding to Fig. 10 but illustrating the employment of bolts and washers as means for adjusting the height of the pocket.

Figure 13 is a plan view of the pocket supporting abutment member illustrated in Figs. 10, 11 and 12.

Figure 14 is a detail view, partly in section and partly in side elevation, showing a construction designed for the employment of another type of adjusting filler.

Figure 15 is a front elevational view of the construction shown in Fig. 14.

Figures 16 and 17 are detail side elevational views of the construction shown in Figs. 14 and 15, but illustrating different adjusted positions of the coupler pocket.

Figure 18 is a detail plan view of a portion of the coupler mounting involving the invention wherein the pocket supporting abutment is formed as a plurality of bars which space the pocket from the adjacent bumper or end sill.

Figure 19 is a view corresponding to Fig. 18 but showing the plates or bars which form the pocket supporting abutment as set in depressions or channels in the bumper or end sill.

Figure 20 is a view corresponding to Fig. 18 but showing the center portion of the rear flange of the coupler pocket as projecting rearwardly between the pocket supporting bars so as to bear against the bumper or end sill.

Figure 21 is a detail view, partly in elevation and partly in vertical section, showing a construction in which the pocket supporting abutment is fashioned with a rearwardly extending upper flange overlapping the top of the bumper or end sill.

In the drawings, 1 indicates the coupler pocket by which the car coupler (not shown) is attached to the bumper or end sill 2 of the tender or other railway vehicle. With the exception of Fig. 20, the coupler pockets shown in the several views are identical in construction. Each of these pocket members 1 is shown as formed with side walls 3 which are connected by top and bottom walls 4 and 5, respectively, and which diverge forwardly from a rear flange or base plate 6 The rear wall of the coupler receiving recess bounded by the side walls 3 and top and bottom walls 4 and 5 is preferably cylindrically curved, as indicated at 8, to form a buffing bearing for the correspondingly curved end of the coupler shank; and the upper and lower walls are provided with suitable apertures 7 and 7', respectively, for receiving the customary pin whereby the coupler is pivotally connected to the pocket casting 1. The pocket member is also preferably fashioned with a forwardly extending shelf 9 which serves to support the coupler in all working positions of the latter. These details of constructions are chosen for the purpose of illustration merely and are not to be regarded as essential to the invention.

The rear flange 6 of the coupler pocket is provided above and below on opposite sides of the coupler receiving recess with vertically elongated openings or slots 10 for receiving bolts 11 which serve to connect the coupler pocket 1 to the adjacent end sill or bumper beam. The width of the slots 10 corresponds to the diameter of the bolts, so that the nuts 12 applied to the outer ends of the latter bear against the outer face of the rear flange 6 of the coupler pocket. The slots 10 are made of a length appropriate to the desired extent of vertical adjustment of the pocket member 1.

Secured to the forward face of the bumper or end sill 2, preferably by means of the bolts 11, is a height adjusting plate 13 which constitutes an abutment for supporting the coupler pocket. This plate, which is interposed between the end sill and the rear flange 6 of the coupler pocket, is fashioned at its lower end with a forwardly projecting lug or flange 14 extending under the lower edge 15 of the rear flange 6 of the pocket member. Between this supporting lug 14 and the face 15 of the coupler pocket, adjusting shims or filler members 16 are interposed. As shown in Figs. 1 to 6, inclusive, these shims may advantageously be formed as integral tripartite members whose sections 17, 18 and 19, respectively, are of cylindrical form, two of its sections being in alinement and extending at right angles to the third. The supporting shelf or lug 14 of the height adjusting plate 13 is provided with perforations 20 adapted to receive either of the branches of the shims or filler members 16, the perforations being in vertical alinement with the rear flange of the coupler pocket. As the several branches of the shims 16 are of different lengths the members 16 are adapted to be assembled in different positions, thereby supporting the coupler pocket 1 at correspondingly different heights of adjustment, as shown in Figs. 3, 4 and 5 of the drawings.

The construction illustrated in Figs. 7, 8 and 9 differs from that heretofore described only in respect to the shim means. In this instance the coupler pocket 1 when in its lowest position seats directly on the supporting flange or lug 14 of the height adjusting plate 13. A short bolt 21, or similar piece of headed metal together with the addition of such number of washers 22 as may be necessary to elevate the coupler pocket to the desired height, is employed as the adjusting shim.

Figs. 10 to 13, inclusive, show a slightly different form of construction in which fillers or shims 21 of the bolt type and adjusting washers 22 may advantageously be employed. In this construction the height adjusting plate 23 interposed between the coupler pocket 1 and the bumper or end sill is provided at its lower end with forwardly projecting lugs 24 which, like the lug or flange 14 of the member 13 heretofore described, serve as supporting abutments for the coupler pocket. Each of the lugs 24 is preferably recessed, as indicated at 25, to receive adjusting washers or plates 22, and each lug is formed with a forwardly opening vertical slot 26 through which the body of the adjusting bolt 21 may pass. The provision of this slot is advantageous in that it permits an adjusting means 21 of bolt type to be slipped into place while the coupler pocket 1 is in a lower position than would otherwise be possible.

The construction illustrated in Figs. 14 to 17, inclusive, differs from the constructions heretofore described only in respect to the form of adjusting shims 27 and the form of the lower portion of the height adjusting plate or abutment member 28. In this form of the invention the member 28 is fashioned at its lower end with forwardly extending laterally spaced lugs 29 which are provided with forwardly opening recesses 30 for receiving the adjusting shims 27, which latter are preferably in the form of blocks of rectangular cross section whose height, width and thickness differ so as to provide the desired range of height adjustment for the coupler pocket 1.

In Fig. 18 the abutment means for supporting the coupler pocket against downward movement is illustrated as being made from two strips or bars 31 instead of from a single plate as shown in the preceding figures, the bars 31 being interposed between the forward face of the bumper or end sill 2 and the rear flange 6 of the coupler pocket. The construction shown in Fig. 19 is the same as that of Fig. 18 except that the adjusting plates 31 are set in depressions or vertical channels 32 in the bumper or end sill. Fig. 20 shows a construction differing somewhat from that illustrated in Fig. 18 in that the central portion 33 of the rear flange of the coupler pocket extends rearwardly between the plates or bars 31 so as to provide full bearing for the rear face of the coupler pocket flange. With the exception of the construction shown in Fig. 6, the upper portion of all the abutment members or adjusting plates for supporting the coupler pocket shown in the various views may, if desired, be formed with a lug or flange 34 adapted to extend rearwardly over the top of the bumper or end sill 2, as shown in Fig. 21. By such means the weight of the coupler pocket will be transmitted directly to the bumper or end sill instead of being communicated thereto through the bolts 11.

It will be noted that the construction makes it unnecessary to remove the coupler or coupler pocket from the bumper or end sill in order to adjust the height of the coupler. It is merely necessary to loosen the bolt nuts 12, slide the coupler pocket 1 upward to the desired height and then place the adjusting shims in proper position, after which the bolt nuts 12 may be again tightened. It will also be appreciated that the construction makes possible the use of adjusting shims of various forms and dimensions, thereby rendering it comparatively easy to supply a satisfactory shim member in the event one intended for the purpose is not available.

I claim:—

1. A coupler mounting comprising a vertically adjustable coupler pocket having an opening adapted to receive a pin for pivotally connecting a coupler to the pocket and having slots adapted to receive bolts for attaching the pocket to a railway vehicle, means mounted on said vehicle constituting an abutment for supporting the pocket against downward movement, and shim means spaced from said slots and interposed between the abutment means and pocket for fixing the height of the pocket.

2. A coupler mounting comprising a vertically adjustable coupler pocket having slots adapted to receive bolts for attaching the pocket to a railway vehicle. a plate interposed between the pocket and the vehicle and provided with a forwardly extending lug portion, and shim means interposed between the said lug portion and the coupler pocket.

3. A coupler mounting comprising a vertically adjustable coupler pocket having an opening adapted to receive means for connecting a coupler thereto and having elongated openings adapted to receive means for attaching the pocket to a railway vehicle, a coupler pocket supporting member rigidly secured to the vehicle, said member having a portion spaced vertically from said elongated openings and disposed in vertical alinement with the coupler pocket, and shim means interposed between the pocket and said portion of the pocket supporting member.

4. A coupler mounting comprising a vertically adjustable coupler pocket adapted to be connected to a car coupler and to a railway vehicle, means mounted on said vehicle for supporting the pocket against downward movement, said means providing a shelf extending under the coupler pocket, and shim means interposed between said shelf and pocket member.

5. A coupler mounting comprising a vertically adjustable coupler pocket having an opening adapted to receive a pin for pivotally connecting a coupler to the pocket and having slots adapted to receive bolts for attaching the pocket to a railway vehicle, a member mounted on the vehicle for supporting the pocket against downward movement, said member providing means in vertical alinement with the coupler pocket forming a seat for a shim device, and a shim device interposed between the said seat and the coupler pocket, the shim device being adapted to be assembled in three positions corresponding to different heights of the coupler pocket.

6. A coupler mounting comprising a vertically adjustable coupler pocket adapted to be connected to a car coupler and having a rear flange formed with slots for receiving bolts for attaching the pocket to a railway vehicle, means mounted on the vehicle and projecting forwardly beneath said rear flange forming an abutment for supporting the pocket against downward movement, and a shim device interposed between said means and the coupler pocket.

7. A coupler mounting comprising a vertically adjustable coupler pocket formed with a flange which is slotted to receive bolts for attaching the pocket to a railway vehicle, means mounted on the vehicle constituting an abutment for supporting the pocket against downward movement, said means being interposed between the vehicle and the coupler pocket and projecting for wardly beneath said flange, and a shim device interposed between said means and the coupler pocket, said means being recessed to receive the shim device.

8. A coupler mounting comprising a vertically adjustable coupler pocket adapted to receive a pin for pivotally connecting a coupler to the pocket and being provided with elongated openings adapted to receive bolts for attaching the pocket to a railway vehicle, a member mounted on the vehicle and interposed between the latter and the coupler pocket, said member extending forwardly beneath the coupler pocket and being provided with spaced recesses, and shim devices extending into the recesses and engaging the coupler pocket.

9. A coupler mounting comprising a vertically adjustable coupler pocket adapted to be connected to a car coupler and having slots adapted to receive bolts for attaching the pocket to a railway vehicle, means mounted on said vehicle constituting an abutment for supporting the pocket against downward movement, said means being provided with forwardly projecting portions extending beneath the coupler pocket, and shims interposed between the portions and the coupler pocket, said portions being recessed to receive the shims and being formed with slots opening into the recesses.

In testimony whereof I affix my signature.

ENOCH GEORGE, Jr.